Aug. 5, 1930.  W. H. MANNING  1,772,187
PISTON PIN
Filed March 23, 1929
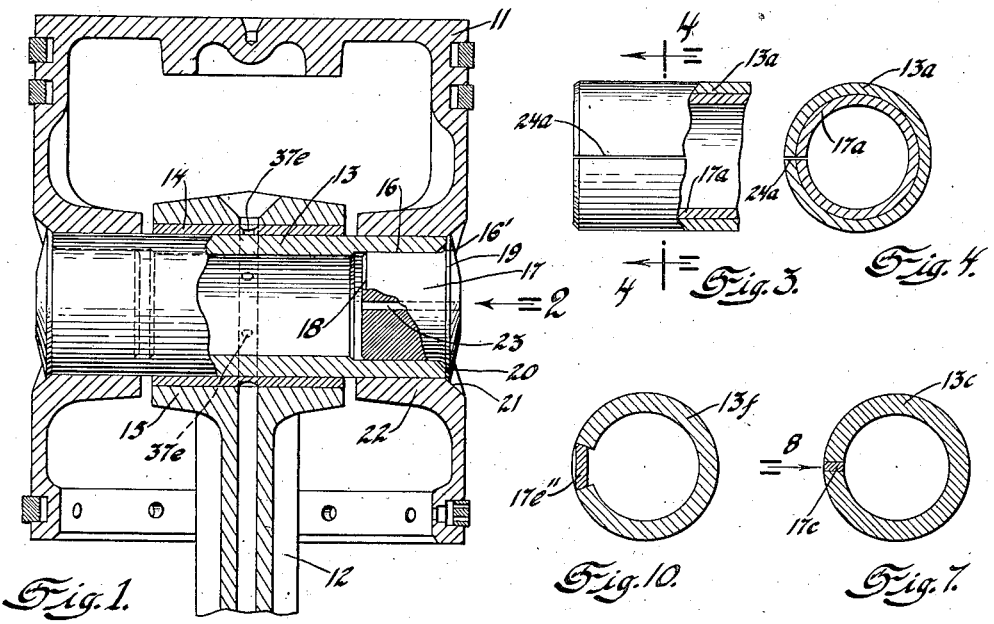
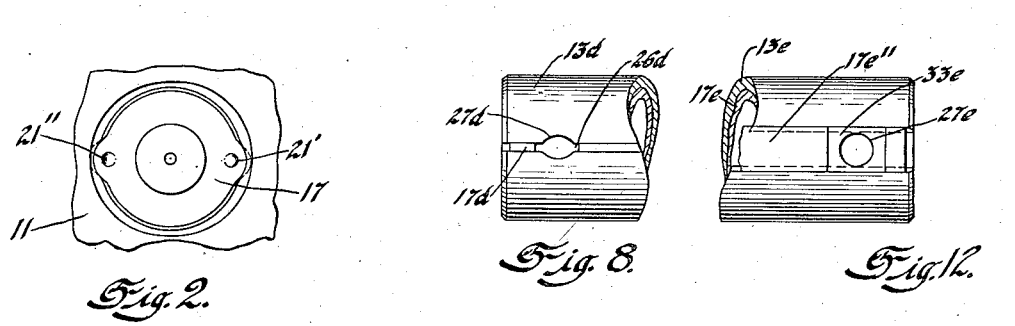
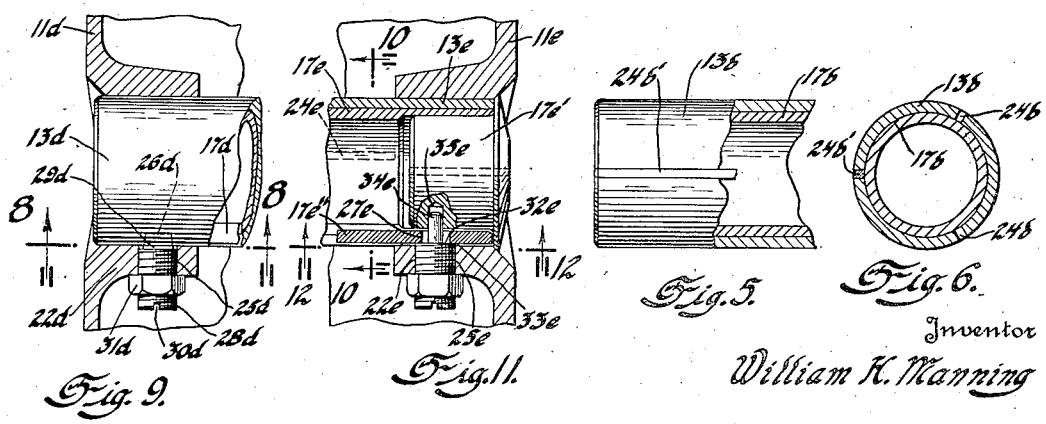
Inventor
William H. Manning
By Blackmore, Spencer & Hirsh
Attorneys Patented Aug. 5, 1930

1,772,187

UNITED STATES PATENT OFFICE

WILLIAM H. MANNING, OF PONTIAC, MICHIGAN, ASSIGNOR TO GENERAL MOTORS CORPORATION, OF DETROIT, MICHIGAN, A CORPORATION OF DELAWARE

PISTON PIN

Application filed March 23, 1929. Serial No. 349,386.

As may be inferred from the above title, this invention relates particularly to improvements in means suitable for use in connecting the pistons of internal combustion engines, or the like, with the so-called "small ends" of rods employed in imparting motion to the cranks of engine shafts; and it is a particular object of this invention to provide pins, ordinarily including relatively hard outer or bearing portions, in which a plurality of metals are so employed as to assure, at all operating temperatures, a desired fit of the mentioned pins within bearing bosses such as may be provided within the mentioned pistons.

The thermal conduction to which piston pins are exposed being variable, it is an object of this invention to provide a bimetallic or other plural-metallic piston pin which is self-adjusting in response to temperature changes such as may result from operation of an internal combustion engine,—in which a loosening of pins, with constant rapid wear, has heretofore frequently resulted from an expansion of piston bosses at a higher rate than that of the pins extending therethrough; and advantageous embodiments of this invention may include inner parts such as so-called "plugs," closely interfitting within outer or major pin parts and formed from a metal or metals (such as brass or aluminum) having a higher rate or rates of thermal expansion than that of the steel or other outer cylindrical parts within whose ends said plugs may be inserted. The result may be either a close but rotation-permitting fit between the pin and the bearing bosses which receive the same or an actual binding and non-rotative permanent connection between the last mentioned parts at all operating temperatures, as hereinafter described.

Other objects of this invention, in which a high-coefficient metallic insert or component may either be permanently bonded to an outer and harder cylindrical major portion of the pin or may be separately formed and provided with means for a wedging or other engagement of said major portion, may be best appreciated from the following description of illustrative embodiments of said invention, taken in connection with the appended claim and the accompanying drawing.

Fig. 1 is a vertical or longitudinal and substantially median section, with parts broken away, through a piston and a portion of a connecting rod, these elements being pivotally interconnected by a piston pin organization which illustrates one highly advantageous form of the present invention.

Fig. 2 is a partial elevational view, taken substantially as indicated by the arrow 2 of Fig. 1.

Fig. 3 may be regarded as either a partial elevational view or a partial plan view, of an alternative form, with parts broken away.

Fig. 4 is a transverse sectional view, taken substantially as indicated by the line 4—4 of Fig. 3.

Figs. 5 and 6 are respectively comparable with Figs. 3 and 4, but show a further alternative form of pin.

Fig. 7 is a view comparable with Fig. 4 or 6, but showing a further alternative.

Fig. 8 is a view comparable with Figure 3; and is adapted to be read either in connection with the arrow 8 of Fig. 7 or the line 8—8 of Fig. 9.

Fig. 9 is a view comparable with the lefthand portion of Fig 1, but showing a pin which may be of the general type illustrated in Fig. 8.

Fig. 10 is a view comparable with Fig. 4, but taken somewhat as suggested by the line 10—10° of Fig. 11, showing an alternative form,—an inwardly-diminishing or wedge-shaped portion being formed separate from an outer and major portion.

Fig. 11 is a view corresponding with the right-hand central portion of Fig. 1, but showing an embodiment of the present invention in which various features illustrated in previous figures are combined.

Fig. 12 is a view, comparable with Fig. 8, taken substantially as indicated by the line 12—12 of Fig. 11.

Referring first to that simple and advantageous embodiment of the present invention illustrated in Figs. 1 and 2, a piston 11 is shown as pivotally secured to a connecting rod 12 by a pin organization comprising a main and outer cylindrical element 13,—this element being preferably formed of a suitable steel and optionally provided, as by chromium plating in a known manner, with a hard exterior bearing surface which is suitable for engagement by a bushing or other bearing element 14, as provided by the "small end" 15 of the connecting rod 12.

The respective ends of the mentioned cylindrical portion or element 13 may be adapted, as by reaming and/or chamfering to a standard interior diameter at 16, 16′ to the reception of suitable high-coefficient inner portions or elements in the form of plugs 17. In preference to giving these plugs an appreciably tapered form or employing any threaded or sweated or welded connection between the mentioned parts, said plugs may be merely suitably rounded or beveled or chamfered at the inner ends thereof, as suggested at 18, and shrunk, driven or pressed or "ring-fitted" into their illustrated positions,—in which peripheral flanges 19, if provided near the outer ends thereof, engage with faces 20 of the cylindrical member 13 and/or conically inclined or other portions 21 of piston bosses 22. If desired, in order to prevent relative rotation between the main cylindrical pin element 13, or its equivalent, and the bosses 22, said pin may be formed very slightly over-size and/or very slightly tapered and pressed or driven to place; the insertion of the high-coefficient cylindrical plugs 17 then contributes to the secure retention of the outer cylindrical element 13 in said bosses and serves to maintain, or even increase, the initial tight fit between the pin and bosses by expansion on rises in temperature during operation; and any suitable expedient, such as a "staking" of the flange 20 in the general manner suggested at 21′, 21″, Fig. 2, may so deform or locally expand said flange as further to diminish risk of relative movement between the mentioned parts or contact thereof with the cylinder wall. The piston is preferably relieved in the region of the bosses; and, if desired, in order to permit the insertion of a tool, separately to dislodge the plugs 17 in case of necessity for a replacement of parts, and/or in order to obviate the development of any internal pressure tending to force the plugs 17 outward as a consequence of expansion of confined air, central or other passages may be provided, as at 23, through one or both of the plugs 17. Aluminum plugs having substantially the dimensions shown in Fig. 1 have been found satisfactory.

In Figs. 3 and 4, a low-coefficient outer cylindrical element $13^a$ is shown as bonded to an inner cylindrical element $17^a$ having a different and ordinarily a higher coefficient of expansion, the resultant pin being shown as provided with a longitudinal kerf or slot $24^a$. The composition and relative thickness of each of the mentioned concentric portions may be varied in accordance with the conditions of use; but it should be understood that the resultant product may be at all times substantially rigid, even though the relatively high expansion of an internal portion $17^a$ (whether bonded or merely tightly inserted within an outer cylindrical element $13^a$) should cause the kerf $24^a$ to open, through its depth as well as its length, at high temperatures.

In the form shown in Figs. 5 and 6, an outer and optionally discontinuous cylindrical element or portion $13^b$ is shown as integrally bonded to a continuous inner cylindrical element or portion $17^b$; and one of the mentioned cylindrical elements may be formed of a suitable high-coefficient metal. For example, the outer element being provided with one or more spiral or straight longitudinal kerfs $24^b$ (extending partially or completely through said outer portion and optionally adapted to contribute to the distribution of a lubricant or to receive strips of an additional metal, as at $24^{b'}$) the inner portion $17^b$, of any desired thickness, may be formed of aluminum, brass, or the like.

Fig. 7 shows a very simple embodiment of the present invention, in which a main cylindrical element or portion $13^c$, externally provided with a bearing surface, receives a longitudinally-extending strip $17^c$ of a high-coefficient metal,—preferably bonded to one or to both of the faces with which it contacts; and Fig. 8 suggests the use, in connection with elements such as have been described in connection with Fig. 7, of an organization in which (a high-coefficient strip $17^d$, if employed, being bonded to only one of the adjacent surfaces of the main pin element $13^d$), provision is made for the use of a thermally expansible and longitudinally adjustable wedge element so disposed as to re-expand the cylindrical element $13^d$ even after wear upon a bearing or the outer element or pin proper may have rendered the expansion of the strip element or elements $17^d$, if left in its original position, inadequate for the desired effect. For example, the bosses $22^d$ may be laterally or upwardly tapped as at $25^d$; a kerf $26^d$ (which may be a kerf to one of whose walls a strip or strips $17^d$ are bonded) may be provided with conical or other surfaces $27^d$, opposite threaded openings $25^d$; and a screw $28^d$, inwardly terminating in a conical wedge element $29^d$, may be so set, as by means of a nick $30^d$ and/or a head or lock nut $31^d$, that thermal expansion of the wedge $29^d$ at elevated temperatures may assure a desired fit of the larger pin element $13^d$.

Any of the pins shown in Figs. 3–9 inclusive may obviously be used either with or without a plug 17 of the general character shown and described in connection with Figs. 1 and 2; any of said pins may comprise inner and outer cylindrical portions formed of metals differing in their rates of thermal expansion; and/or, if desired, a high-coefficient wedge element may be disposed longitudinally of the pin, as suggested in Figs. 10, 11 and 12, and provided with suitable means for inwardly adjusting the same.

In figures last referred to, to illustrate the practicability of utilizing substantially all of the mentioned features in a single embodiment of the present invention (as may be desirable only under very exceptional circumstances), a pin comprising an outer cylindrical element 13$^e$ and an inner cylindrical element 17$^e$ of high-expansion metal is shown as receiving a plug 17$^{e\prime}$ and also a longitudinally extending and relatively movable wedge element 17$^{e\prime\prime}$,—which may be related thereto in the general manner suggested in Fig. 10 and may be adjustable by means such as a screw 25$^e$. This screw is shown as extending through a threaded boss 22$^e$ and as provided with substantially flat shoulders 32$^e$,—adapted to engage cooperating shoulders 33$^e$, as provided by the edges of openings 27$^e$, extending through the strip 17$^{e\prime\prime}$. The outer cylindrical shell 13$^e$ may be longitudinally kerfed at 24$^e$, in the general manner suggested in the Figs. 5 and 6, and the plug 17$^{e\prime}$, if provided, may be "staked" as suggested in connection with Fig. 2 and/or additionally retained by means such as an engagement of an inwardly extending cylindrical projection 34$^e$, integral with the screw 25$^e$ and engaging the inner end of the plug 17$^{e\prime}$ or interfitting within a suitable opening 35$^e$ in said plug. The lubricating provisions suggested at 37$^e$ are not unimportant, but they are only remotely pertinent to this invention.

As suggested in Fig. 10, the manually adjustable features mentioned in connection with Fig. 11 or Fig. 12 may be employed in connection with a mere split cylindrical hollow pin 13$^f$; but it will be obvious not only that the principles of this invention are applicable to produce either a uniformly tight fit or a uniform or varying clearance for a desired lubricating or other effect; and that various features of the present invention might be independently employed but also that numerous modifications and/or combinations additional to or quite distinct from any suggested herein might be easily devised to provide thermally self-adapting piston pins suitable for use at abnormally high and/or ordinary and/or abnormally low operating temperatures,—all within the scope of the present invention.

I claim:

1. For use within an engine piston, a rod-connecting element in the form of a thermally self-adapting wrist pin comprising: an outwardly disposed major portion formed of a relative hard metal providing a connecting rod bearing and having a comparatively low coefficient of thermal expansion; and a relatively high-coefficient additional portion, so disposed therein as to maintain a non-rotative fit of said pin, within bosses provided upon said piston, at all operating temperatures of said engine.

2. For use within an engine piston, a rod-connecting element in the form of a thermally self-adapting wrist pin comprising: an outwardly disposed major portion formed of a relative hard metal providing a connecting rod bearing and having a comparatively low coefficient of thermal expansion; and a relatively high-coefficient additional portion, so disposed therein as to maintain a non-rotative fit of said pin, within bosses provided upon said piston, at all operating temperatures of said engine,—said major portion being substantially cylindrical throughout its length and said additional portion being in the form of an end plug interfitting within said major portion.

3. For use within an engine piston, a rod-connecting element in the form of a thermally self-adapting wrist pin comprising: an outwardly disposed major portion formed of a relative hard metal providing a connecting rod bearing and having a comparatively low coefficient of thermal expansion; and a relatively high-coefficient additional portion, so disposed therein as to maintain a non-rotative fit of said pin, within bosses provided upon said piston, at all operating temperatures of said engine,—said major portion being substantially cylindrical throughout its length and said additional portion being in the form of an end plug interfitting within said major portion, and having an opening extending therethrough.

4. For use within an engine piston, a rod-connecting element in the form of a thermally self-adapting wrist pin comprising: an outwardly disposed major portion formed of a relative hard metal providing a connecting rod bearing and having a comparatively low coefficient of thermal expansion; and a relatively high-coefficient additional portion, so disposed therein as to maintain a non-rotative fit of said pin, within bosses provided upon said piston, at all operating temperatures of said engine, said major portion being substantially cylindrical in form and provided with a longitudinal kerf.

5. For use within an engine piston, a rod-connecting element in the form of a thermally self-adapting wrist pin comprising: an outwardly disposed major portion formed of a relative hard metal having a comparatively low coefficient of thermal expansion; and an additional portion formed of a relatively high coefficient metal, so disposed therein as to assure a satisfactory fit of said pin, within bosses provided upon said piston, at substantially all operating temperatures of said engine, said major portion being substantially cylindrical in form and provided with a longitudinal kerf receiving a portion of said high-coefficient metal.

6. For use within an engine piston, a rod-connecting element in the form of a thermally self-adapting wrist pin comprising: an outwardly disposed major portion formed of a relative hard metal having a comparatively low coefficient of thermal expansion; and a relatively high-coefficient additional portion, so disposed therein as to assure a satisfactory fit of said pin, within bosses provided upon said piston, at substantially all operating temperatures of said engine, said major portion being substantially cylindrical in form and provided with a longitudinal kerf having a wedge set therein.

7. For use within an engine piston, a rod connecting element in the form of a thermally self-adapting wrist pin comprising: an outwardly disposed major portion formed of a relative hard metal having a comparatively low coefficient of thermal expansion; and a relatively high-coefficient additional portion, so disposed therein as to assure a satisfactory fit of said pin, within bosses provided upon said piston, at substantially all operating temperatures of said engine, said major portion being substantially cylindrical in form and provided with a longitudinal kerf having a wedge set therein; and means for inwardly adjusting said wedge.

8. For use in a pivotal connection of the general character described, a self-adapting pin comprising: a substantially cylindrical wear-receiving outer portion having a comparatively low rate of thermal expansion with its ends anchored with piston bosses; and means therein tending to effect an expansion of said boss engaging ends on rise in temperatures, at a rate different from that of said bosses, said means comprising end plugs tightly fitting within said outer portion and formed of a metal differing therefrom in its coefficient of expansion.

9. For use in a pivotal connection of the general character described, a self-adapting pin comprising: a substantially cylindrical wear-receiving outer portion having a comparatively low rate of thermal expansion; and means therein for effecting an expansion thereof, on rise in temperatures, at a rate different from that of said outer portion, said outer portion being provided with a longitudinal slot containing said means.

10. For use in a pivotal connection of the general character described, a self-adapting pin comprising: a substantially cylindrical wear-receiving outer portion having a comparatively low rate of thermal expansion; and means therein for effecting an expansion thereof, on rise in temperatures, at a rate different from that of said outer portion, said means including a strip of high-coefficient metal movable within a slot in said outer cylindrical portion.

11. For use in a pivotal connection of the general character described, a self-adapting pin comprising: a substantially cylindrical wear-receiving outer portion having a comparatively low rate of thermal expansion; and means therein for effecting an expansion thereof, on rise in temperatures, at a rate different from that of said outer portion, said means including a strip of high-coefficient metal movable within a slot in said outer cylindrical portion and provided with means for its adjustment therein.

12. An anchoring means for maintaining a non-rotative fit between a hollow wrist pin and a piston boss during all changes in operating temperature which consists of an element fitted within said wrist pin having a higher coefficient of thermal expansion than said wrist pin and piston boss.

13. In a wrist pin assembly, piston bosses, a wrist pin having a comparatively low coefficient of thermal expansion press-fitted within said piston bosses, and means within said wrist pin having a relatively higher coefficient of thermal expansion, which is adapted to prevent any reduction in press fit arising between said bosses and wrist pin on a rise in operating temperature by causing expansion of said wrist pin at a higher rate than the expansion of said bosses.

14. In a wrist pin assembly, piston bosses, a hollow steel wrist pin press-fitted within said bosses, and aluminum plugs press-fitted within the ends of said wrist pin, whereby the same is rendered thermally self-adapting in that the press-fit between the wrist pin and bosses will be maintained or increased during all changes in operating temperature by the relative contraction and expansion of said plugs.

15. In a piston and connecting rod assembly, a hollow wrist pin, a connecting rod journalled thereon, and piston bosses within which said wrist pin is press-fitted, said wrist pin, connecting rod and piston bosses having substantially the same coefficient of thermal expansion, and plugs having a relatively higher coefficient of thermal expansion fitted within the ends of said wrist pin, whereby suitable clearance between said connecting rod and wrist pin and suitable press-fit between said wrist pin and piston bosses will be maintained during changes in operating temperature.

16. An anchoring means for maintaining a non-rotative fit between a wrist pin and a piston boss during changes in operating temperature which consists of an element fitted within an end of said wrist pin, said pin having at such end a circumferentially continuous wall and said element having a higher coefficient of thermal expansion than said wrist pin and piston boss.

17. In a wrist pin assembly, piston bosses, a steel wrist pin having circumferentially continuous wall portions press-fitted within said bosses, and aluminum plugs press-fitted within said portions, whereby said wrist pin is rendered thermally self-adapting in that the press-fit between said wrist pin and bosses will be maintained or increased during rise in operating temperature by expansion of said circumferentially continuous wall portions by expansion of said plugs.

In testimony whereof I affix my signature.

WM. H. MANNING.